No. 629,130. Patented July 18, 1899.
E. W. JEWELL.
ELECTRICAL MEASURING INSTRUMENT.
(Application filed May 18, 1899.)
(No Model.)
Fig. 1.
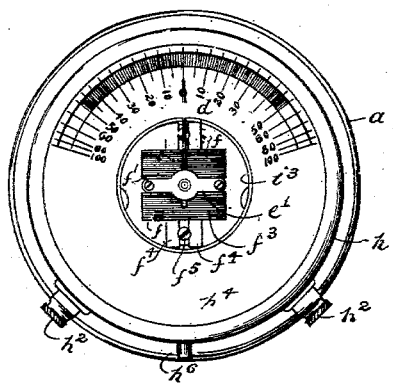
Fig. 2
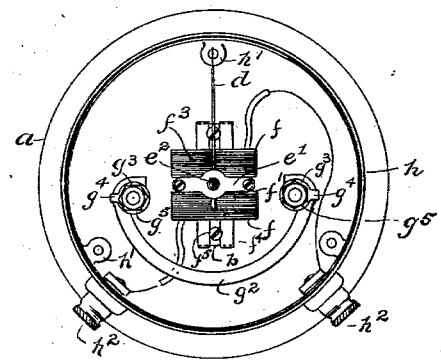
Fig. 3
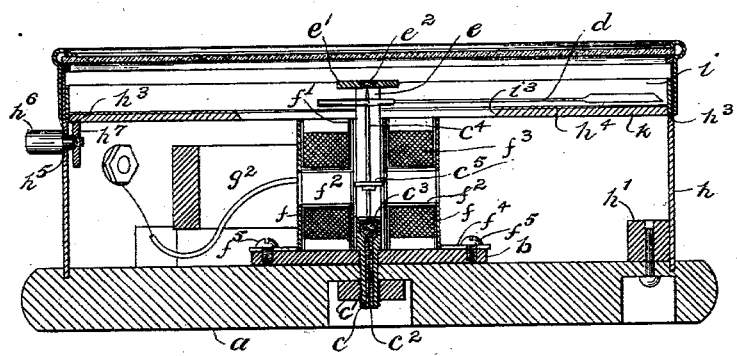
Fig. 4
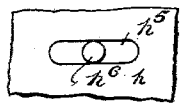
Fig. 5
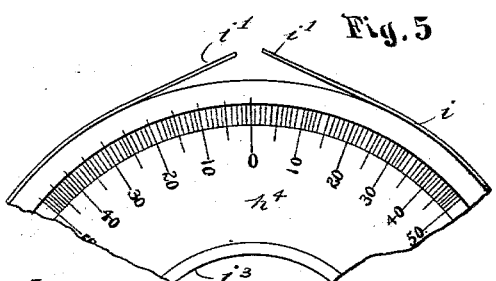
Fig. 7
Fig. 6.
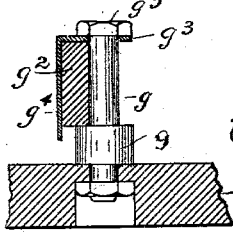
Witnesses:
G. S. Noble
Percy C. Gill
Inventor.
Edward W. Jewell
By Ludington & Jones
Att'ys.

UNITED STATES PATENT OFFICE.

EDWARD W. JEWELL, OF CHICAGO, ILLINOIS.

ELECTRICAL MEASURING INSTRUMENT.

SPECIFICATION forming part of Letters Patent No. 629,130, dated July 18, 1899.

Application filed May 18, 1899. Serial No. 717,321. (No model.)

*To all whom it may concern:*

Be it known that I, EDWARD W. JEWELL, a citizen of the United States, residing at Chicago, in the county of Cook and State of Illinois, have invented a certain new and useful Improvement in Electrical Measuring Instruments, of which the following is a full, clear, concise, and exact description, reference being had to the accompanying drawings, forming a part of this specification.

My invention relates to an electrical meter for electrical circuits, my object being more particularly to provide a form of construction which is readily adapted to ampere-meters and especially to meters for measuring very small currents, which meters are more commonly known as "milliampere-meters." The features of my invention are, however, applicable to other forms of meters. It is the purpose of the present invention to provide means whereby the parts of the meter may be readily adjusted for extreme accuracy, and my invention contemplates arrangements whereby the dial-pan and the coils of the instrument may be adjusted in position.

In accordance with my invention I mount the dial-pan so that the same may partake of a rocking movement or partial rotation relative to the body of the instrument upon which the index or pointer and the magnet are supported, whereby the dial-pan may be moved as desired to bring the index to the zero position. In assembling the parts initially it is desirable to provide a construction whereby the coils may be readily adjusted with reference to the magnet, and in accordance with the present invention I mount the coils upon a support whereby the same may be rocked relatively to the magnet and maintained in the adjusted position, and I further mount the coils so that the same may partake of a movement toward and from each other to thereby adjust the same relatively to the needle of the instrument to vary the strength of the magnetic field to which the same is subjected.

I have illustrated my invention in the accompanying drawings, in which—

Figure 1 is a plan view of the meter. Fig. 2 is a plan view of the interior of the meter with the scale-pan removed. Fig. 3 is a cross-sectional view of the meter. Fig. 4 is a detail view of the handle for adjusting the scale-pan. Fig. 5 is a partial view of the scale-pan, showing the elastic tongues thereon. Fig. 6 is a detail view of the magnet-support. Fig. 7 is a view showing the manner in which the arbor is supported.

Like letters refer to like parts in the several figures.

Upon the insulating-base $a$ is mounted a base-plate $b$, held in position by a threaded shank $c$, which passes through the center of the plate, the lower end thereof carrying a nut $c'$ to lock the plate in position. The shank $c$ carries a threaded bore, within which fits the screw $c^2$, carrying a jewel $c^3$ in the upper end to serve as a bearing. Upon the base-plate $b$ the upright posts $e\ e$ are mounted and support upon the upper end the bridge $e'$, which carries the jewel $e^2$, in which rests the upper end of the arbor $c^4$, the other end being supported by the jewel $c^3$. The arbor carries near its upper end the index $d$ and near its lower end the needle $c^5$. Mounted upon the base-plate $b$ are the spools for the windings, which consist of two parallel side plates $f\ f'$, supporting a hollow shell $f^2$. Upon the spools are the windings $f^3\ f^3$. The outer side plates $f\ f$ carry the slotted plates $f^4\ f^4$ at right angles thereto, through which pass the screws $f^5\ f^5$. By this construction the spools may be moved to any desired position and secured in position by the screws $f^5$. The posts $g\ g$ carry upon the shoulders $g'\ g'$ the ends of the magnet $g^2$, which are held in position by the washers $g^3\ g^3$, carrying the fingers $g^4\ g^4$, which are bent down over the outer portion of the magnet, and the nuts $g^5\ g^5$ are secured upon the base.

Surrounding the parts heretofore described is the casing $h$, secured to the base by means of the screws passing up through the bottom of the base and entering the circular portions $h'\ h'$, carried on the inner wall of the casing. Upon the outer wall of the casing binding-posts $h^2\ h^2$ are mounted, the same being insulated from the casing. The binding-posts form the opposite terminals of the windings $f^3\ f^3$, which are connected in series. Through the opening or slot $h^5$ in the casing a screw $h^6$ extends, being attached to a lug $h^7$, carried upon the lower face of the scale-pan $h^4$. The scale-pan $h^4$ rests upon a shoulder $h^3$, carried on the casing $h$. By means of the screw $h^6$ serving as a handle the scale-pan may be partially rotated to adjust the scale with reference to the index. The scale-pan is provided upon the periphery with a rim $i$, having two free ends or tongues $i'$ $i'$, which form springs or resilient tongues and press against the inner face of the casing to hold the pan in any adjusted position to which the same may be moved. The scale-pan has the graduations formed upon the face thereof and has a circular opening $i^3$ at the center. Over the face of the meter is placed a glass cover, the outer edge of which fits in a metallic rim designed to slip over the casing.

The magnetic field generated by the windings acts upon the needle to move the index over the scale-pan. When it is desired to adjust the zero-point on the scale to the position of rest of the index, the scale-pan may be partially rotated to the desired degree. When it is desired to adjust the strength of the field to which the needle is subjected, the screws $f^5$ $f^5$ may be loosened to permit the spools to be moved to adjust the strength of the field to the required degree, after which the spools may be clamped in position by means of the screws $f^5$ $f^5$. In assembling the parts or when it is desired to make an adjustment of the windings relatively to the magnet the nut $c'$ may be loosened and the base-plate $b$ may then be partially rotated about the shank $c$ to carry the windings to the proper position, after which the nut may be tightened to lock the parts in position.

Having described my invention, what I claim as new, and desire to secure by Letters Patent, is—

1. In an electrical measuring instrument, the combination with a casing, of magnet-windings mounted therein, and a scale-pan rotatably mounted upon said casing independently of the magnet-windings, substantially as described.

2. In an electrical measuring instrument, the combination with a casing having a shoulder formed thereon, of a scale-pan supported upon said shoulder and arranged to be partially rotated to permit adjustment of the same, substantially as described.

3. In an electrical measuring instrument, the combination with a casing having a shoulder formed on the inner wall thereof, of a scale-pan resting thereon and arranged to be rotated and provided with a resilient tongue adapted to engage the casing, substantially as described.

4. In an electrical measuring instrument, the combination with a casing, of a scale-pan rotatably supported thereon and carrying a rim having a portion thereof partially severed to form a resilient tongue adapted to engage the casing, substantially as described.

5. In an electrical measuring instrument, the combination with a casing, of a scale-pan rotatably mounted thereon, and a handle secured to the scale-pan and passing through a slot in the casing, whereby the scale-pan may be adjusted in position, substantially as described.

6. In an electrical measuring instrument, the combination with a base, of a casing mounted thereon, a scale-pan mounted upon said casing, and a support for the magnet-winding mounted upon the base and rotatable thereon to permit adjustment relative to the scale-pan, substantially as described.

7. In an electrical measuring instrument, the combination with a pair of spools for the windings of a support upon which the same are mounted, and means for permitting the movement of the spools toward and from each other to adjust the same, substantially as described.

8. In an electrical measuring instrument, the combination with a supporting-plate, of a pair of spools mounted thereon having laterally-extending portions provided with slots, and a screw passing through each of said slots whereby the relative positions of the spools may be adjusted, substantially as described.

9. In a meter, the combination with a supporting-plate having a central shank provided with a threaded bore and a threaded exterior, of a screw fitting in said bore and carrying the journal or jewel for the arbor and a nut screwing upon the exterior of said shank to lock the supporting-plate in position, substantially as described.

10. In an electrical measuring instrument, the combination with a base, of a supporting-plate having a central shank passing through said base, a nut screwing upon said shank, and spools for the windings supported upon said plate, substantially as described.

11. In an electrical measuring instrument, the combination with a base, of a supporting-plate thereon provided with a central shank extending therethrough, a nut adapted to screw upon the end of said shank, spools for the windings mounted upon said plate, and means for permitting the movement of said spools toward and from each other, substantially as described.

12. In an electrical measuring instrument, the combination with the casing, of an annular scale-pan rotatably mounted thereon, and magnet-windings independent of the scale-pan and mounted within the central opening of said scale-pan, substantially as described.

13. In an electrical measuring instrument, the combination with a base, of a casing mounted thereon, a rotatable scale-pan mounted upon said casing, and a rotatable support for the magnet-windings mounted upon said base, substantially as described.

14. In an electrical measuring instrument, the combination with a base, of a supporting-plate for the magnet-windings carrying a central shank passing through said base about which the plate may be rotated, and a nut fitting on said shank to hold the supporting-plate in an adjusted position, substantially as described.

In witness whereof I have hereunto subscribed my name in the presence of two witnesses.

EDWARD W. JEWELL.

Witnesses:
W. CLYDE JONES,
PERCY C. GILL.